(12) United States Patent
Alex

(10) Patent No.: US 8,301,738 B1
(45) Date of Patent: Oct. 30, 2012

(54) SYSTEMS AND METHODS FOR PRIVATE NETWORK ADDRESSING IN IP PROTOCOLS

(75) Inventor: Ramachandran Nirmala Alex, Tamil Nadu (IN)

(73) Assignee: Novell, Inc., Provo, UT (US)

( * ) Notice: Subject to any disclaimer, the term of this patent is extended or adjusted under 35 U.S.C. 154(b) by 2061 days.

(21) Appl. No.: 10/631,509

(22) Filed: Jul. 31, 2003

(51) Int. Cl.
*G06F 15/177* (2006.01)
(52) U.S. Cl. ........................ 709/222; 709/220
(58) Field of Classification Search .......... 709/220, 709/222
See application file for complete search history.

(56) References Cited

U.S. PATENT DOCUMENTS

| | | | | |
|---|---|---|---|---|
| 5,872,779 | A | 2/1999 | Vaudreuil | |
| 6,011,795 | A | 1/2000 | Varghese et al. | |
| 6,226,751 | B1 | 5/2001 | Arrow et al. | |
| 6,339,595 | B1 | 1/2002 | Rekhter et al. | |
| 6,381,638 | B1 | 4/2002 | Mahler et al. | |
| 6,385,649 | B1 * | 5/2002 | Draves et al. | 709/224 |
| 6,516,417 | B1 | 2/2003 | Pegrum et al. | |
| 6,523,068 | B1 | 2/2003 | Beser et al. | |
| 6,532,217 | B1 | 3/2003 | Alkhatib et al. | |
| 6,556,584 | B1 | 4/2003 | Horsley et al. | |
| 6,563,823 | B1 | 5/2003 | Przygienda et al. | |
| 6,581,108 | B1 | 6/2003 | Denison et al. | |
| 6,594,704 | B1 | 7/2003 | Birenback et al. | |
| 6,657,991 | B1 * | 12/2003 | Akgun et al. | 370/352 |
| 6,671,725 | B1 * | 12/2003 | Noel et al. | 709/226 |
| 6,697,360 | B1 * | 2/2004 | Gai et al. | 370/389 |
| 6,708,219 | B1 * | 3/2004 | Borella et al. | 709/245 |
| 7,080,161 | B2 * | 7/2006 | Leddy et al. | 709/250 |
| 7,216,166 | B2 * | 5/2007 | Sugauchi et al. | 709/224 |
| 2002/0012320 | A1 * | 1/2002 | Ogier et al. | 370/252 |

OTHER PUBLICATIONS

NetLogic Microsystems(TM); CIDR Longest Prefix Matching in Network Search Engines; Mar. 2001.*
Website printout, *IP Version 6 Addressing Architecture*, http://www.rfc-editor.org/rfc/rfc2373.txt, printed Jul. 8, 2003.
Website printout, *Internet Protocols*, http://www.cisco.com/univercd/cc/td/doc/cisintwk/ito_doc/ip.htm, printed Jul. 8, 2003.
Website printout, *Everything You Need to Know about TCP/IP and the Internet*, http://www.windowsitlibrary.com/Content/386/02/3.html, printed Jul. 8, 2003.

(Continued)

*Primary Examiner* — Brian P Whipple
(74) *Attorney, Agent, or Firm* — King & Schickli, PLLC

(57) ABSTRACT

According to one embodiment, a method for generating private network addresses for scopes of validity within a network is provided. The method comprises generating an address prefix or address modifier indicating the type of scopes, the instances of the scopes, and the relative position of the scopes in the network. In this illustrative embodiment, the type of scope determines the value of the prefix data placed in the address prefix and/or the location of that prefix data within the address prefix. The method further comprises generating a standard Internet protocol address for the scope to be created, the address including a subnet prefix and a host ID. The method further comprises saving the address prefix in a routing data structure along with the standard Internet protocol address, such that the address prefix is associated at a higher level in the hierarchy of the standard Internet protocol address. The routing data structure is configured with these extended prefixed addresses to be utilized in the selective communication of data to the correct scope. According to some embodiments, the address combines the scope hierarchy and the standard IP address into a single prefix based scoped network hierarchy.

24 Claims, 4 Drawing Sheets

OTHER PUBLICATIONS

Website printout, *Re: [Tsvwg] Regarding IPv6 address scope*, http://www.ietf.org/mail-archive/working-groups/tsvwg/current/msg02238.html, printed Jul. 10, 2003.

Website printout, *Overview of KAME Project*, http://www.kame,net/project-overview.html, printed Jul. 10, 2003.

Website printout, *Internet Protocol Version 6*, http://research.Microsoft.com/msripv6/, printed Jul. 10, 2003.

Website printout, *Re: Question on scopes involving IPv6 addresses*, http://www.wcug.wwu.edu/lists/ipng/200103/msg00039.html, printed Jul. 10, 2003.

Website printout, *The Technical Case for IPv6*, http://www.ipv6style.jp/en/tech/latest.shtml, printed Jul. 18, 2003.

Website printout, *Writing a simple IPv6 program Configuring an IPv6 address and porting an IPv4 application to IPv6*, http://www-106.ibm.com/developerworks/library/wa-ipv6.html, printed Jul. 23, 2003.

Website printout, *Linux IPv6 HOWTO*, http://linux-howto.ipv6.pt/Linux+IPv6-HOWTO/x611.html, printed Jul. 23, 2003.

Website printout, *IP Addresses*, http://support.baynetworks.com/library/tpubs/html/switches/bstream/115401A/L__12.HTM, printed Jul. 23, 2003.

\* cited by examiner

A ---------- R ---------- B

A ------ R1 ------------ R ---------- R2 ------------ B

SYSTEMS AND METHODS FOR PRIVATE NETWORK ADDRESSING IN IP PROTOCOLS

TECHNICAL FIELD

Embodiments of the present invention relate generally to systems and methods for private network addressing, and, more specifically, in some embodiments, to methods and systems for differentiating private addresses at scope domain boundaries using Internet protocols.

BACKGROUND

In computer networks, the Internet Protocol (IP) is a network-layer protocol that contains addressing information and control information that enables packets to be routed. The IP protocol supports both private addressing, for internal networks not accessible by the public at large, and public addressing schemes for publicly accessible networks. For a public IP address, the information for the IP address is entered into the Internet's global routing tables and can be accessed from any other valid IP address on the Internet. Public IPs are be used for servers and network hardware that will be used from or by the Internet.

In contrast, private IP addresses are part of the IP addressing scheme but are not globally recognized and cannot be addressed directly from an external network like the Internet. Private addressing is used in IP protocols for conserving address spaces and also as a form of security. In particular, the use of private addresses allows the private network to use the Internet Protocol without requiring use of a public address that could otherwise be used for a public network. Moreover, each private address can define a scope of validity which can be limited in terms of users and functions.

Internet protocol version 4 (IPv4 protocol), a 32 bit architecture, has committed the address ranges 10.X.X.X, 172.X.X.X and 192.X.X for class A, B and C addressing. Each four byte address is divided into two portions: a network portion which identifies the network and a host portion which identifies the node. All nodes within a network will have the same network portion, while each node will have a unique host portion. Class A addresses are to be used for networks with a large number of hosts. The first byte is the network portion and the three remaining bytes are the host portion. Class B addresses are to be used in medium to large networks with the first two bytes making up the network and the remaining two are the host portion. Class C is for small networks with the first three bytes making up the network portion and the last byte the host portion. Each network assigned can be further divided into subnetworks (subnets) for efficiency. When a network is divided into subnets, the host address portion of the IP address is divided into two parts. The host address portion specifies both the subnet of the IP network and the node on that subnet, the subnet being identified by bits called the "subnet mask" and the node being identified by the remaining bits. In essence, a subnet mask locally extends the network address portion of an IP address and reduces the host portion. Thus, as the size of the subnet mask increases, the number of hosts decreases and the number of subnets increases The next generation internet protocol, IPv6, a 128 bit architecture has committed address ranges FE80:: for link local addressing and FEC0:: for site local addressing. A link local address is typically defined for each link, while a site local address can be defined as desired by a user, and can encompass multiple networks, subnetworks, company departments, company locations, and/or links. The site local addresses are intended to mimic the behavior of 10.X.X.X address ranges defined in IPv4.

However, a potential problem arises when assigning private addresses when using such protocols. In particular, a router which binds together different networks must deal with possible multiple private addressed regions, or scopes, which are various user-defined regions of validity or permitted access. For example, a given scope may include the router interface to a subnetwork, the link to that subnetwork and the subnetwork itself. An addressing problem can arise during the assignment of addresses at the hierarchical boundaries of such scopes. As an extreme example, a router supporting two administrative domains can be connected to two separate logical networks having the same address range allocated to them.

For instance, a router having IP address 10.1.1.1 for Interface 1 (a link local private address) may be in communication with 10.1.1.2 in the private address region A (a site local private address), while Interface 2 of the router may have IP address 10.1.1.2 which is in communication with address 10.1.1.1 in the private address region B. Thus, interface 1 has the same address as private region B, and interface 2 has the same address as private region A. An application residing on the domain router, such as a web server for example, needs to distinguish between the two redundant addresses for security reasons. In addition if these two addresses are part of a larger administrative authority which would like to address some of the hosts in each network using a public address, this capability of distinguishing the addresses needs to be supported. These problems get aggravated with the growth of the Internet and increased use of private addresses.

In IPv6, the addressing architecture mandates that every node supports link local addresses for communication. Thus, any router has to have implicit private addressing support for even basic applications. With the use of automatic address assignments, there remains the possibility of address space collisions among private domains, since there is no way of automatic verification of address conflicts across private domains. Some address differentiation could be done by ensuring that the host identification part of the addresses is uniquely assigned. In practice, however, since there are different ways of generating the host identification part of the address, there is still no guarantee of uniqueness of the addresses. While duplicate address detection capability is available, such mechanisms can guarantee address uniqueness only within a domain or link but not across different interfaces of a router. It is therefore possible that address space conflicts can still occur across different scope domains and at boundaries between scope hierarchies.

In other words, protocols like IPv4 and IPv6, which have fixed address lengths, do not have built-in support for region identification for private addresses or scopes. Accordingly, methods and systems are desired for differentiating addresses at scope domain boundaries.

SUMMARY OF THE INVENTION

Accordingly, methods and systems are provided for differentiating addresses at scope domain boundaries. In particular, a node such as a router residing at a private region boundary is provided with internal mechanisms to differentiate the regions it is connected to and unambiguously identify to which host an application wants to refer. Such differentiation is provided which takes into account the two primary hierarchies, the standard addressing hierarchy for subnetworks, as well as the nested region hierarchy for link, site, and global scopes.

According to one embodiment, a method for generating a private network address for a scope within a network is provided. The method comprises determining the type of scope to be created, and, based upon the type of scope to be created, generating an address prefix containing prefix data. In this illustrative embodiment, the type of scope determines the value of the prefix data placed in the address prefix and/or the location of that prefix data within the address prefix. The method further comprises generating a standard Internet protocol address for the scope to be created, the address including a subnet prefix and a host ID. The method further comprises saving the address prefix in a routing table along with the standard Internet protocol address, such that the address prefix is associated with the standard Internet protocol address. The routing table is configured to be utilized in the selective communication of data with the scope.

According to another embodiment, a network of computer devices is provided. The network comprises a plurality of hierarchical scopes, each scope indicating various devices that are allowed certain access rights to data by a routing device. The network further includes a routing data structure, such as a table, created by a routing device from configuration data for use by the device in allowing access to data by devices within the scopes. The table includes modified address for each scope, the modified address including an scope portion for identification of the scope and a standard portion conforming to a standard protocol. The routing table may comprise a Patricia trie or other longest matching prefix type of structure, and the scopes may comprise global scopes, site local scopes and link local scopes.

In accordance with another embodiment, a system is provided for automatically creating a scope address for use with entities within a larger network. The exemplary system includes an address request interface configured to receive a request for the generation of an address for a region of validity within a network that includes subnetworks, and an address generation module configured to create an extended address for the region of validity based upon the request received from the address request interface. The extended address corresponds to the accepted protocol within the network, and the extended address mimics the protocol utilized for subnetworks within the network. The system further includes an address storage module configured to store the address within a data structure utilized for routing data within the network.

According to yet another embodiment, a computer readable medium is provided having encoded thereon a data structure for identifying a network address of a scope of validity within a network. The data structure comprises a standard address portion and an address extension portion. The standard address portion corresponds to an accepted standard protocol within the network, while the address extension portion, in conjunction with the standard address portion, forms a network address for a network device. The address extension portion includes scope identification data for identifying the type of scope corresponding to the network address and identifying whether the device represented by the network address may communicate with an application. The standard address portion and address extension portion are stored so as to be used in conjunction.

In accordance with another embodiment, a method is provided for creating network addresses for scopes of validity within a network. This illustrative method utilizes executable instructions and comprises receiving a data signal indicating a request to create a scope address indicating the validity of information to be communicated to a group of entities within a network. In this example, the signal includes the type of scope to be created, the relative position of the scope within a hierarchy of scopes, and the instance to which the scope is associated. The method further comprises generating a standard network address in response to the data signal, and generating an address extension in response to the data signal. The extension identifies the type of scope, the hierarchy of the scope, and the link to which the scope is associated. The method further includes forming a single address from the standard network address and the address extension, and storing the single address in a single routing table.

BRIEF DESCRIPTION OF THE DRAWINGS

The accompanying drawings, incorporated in and forming part of the specification, depict several illustrative embodiments, which, together with their descriptions, serve to explain principles of the present inventions. In the drawings.

DETAILED DESCRIPTION OF ILLUSTRATIVE EMBODIMENTS

In general, embodiments of the invention relate to improved methods and systems for private network addressing. In particular, embodiments of the invention relate to a network addressing architecture, such as can be used with standard Internet protocols, where scopes are represented in a manner which correlates with the representation of sub-networks, but by using address extensions, such as by using prefixes or suffixes, or by using other address modifiers, such as bits within a standard portion of the address. In some embodiments, shorter prefixes can be assigned for broader scopes and longer prefixes for shorter scopes. This representation solves the problem of the containment relationship existing between scopes. The modified scope addresses can be stored along with the standard network addresses in single storage entity, such as in a Patricia trie for example. Moreover, according to some embodiments, different instances of scopes can be represented by different network values in the prefix, such as by using different network values for the same prefix length.

In particular, according to some embodiments, the standard scope hierarchy is converted to a subnet-like extended hierarchy via prefix extensions or other appropriate address modification formats. In these embodiments, the new extensions correlate with subnet prefix protocol and can be referenced by different subnet lengths. The different regions can be referenced using this new hierarchy. This new internal address format can be used in a longest prefix matching routing table implemented as a Patricia trie or other suitable longest prefix matching algorithm. Such an addressing scheme can provide flexibility to accommodate nested private regions by way of an addressing architecture which correlates with sub-netting architecture. Packet operations, like forwarding and locally deliver of the packets, can use the addressing scheme. Applications can then be classified as scope aware applications and scope unaware applications, with the default being scope unaware applications. Routing protocols which control the packet forwarding decisions can also be classified as scope aware and unaware forms. Accordingly, an internal network can be therefore be built with its own addressing scheme.

Reference will now be made in detail to various illustrative embodiments of the invention, examples of which are illustrated in the accompanying drawings, wherein like numerals indicate corresponding elements throughout the views.

Figure 1:
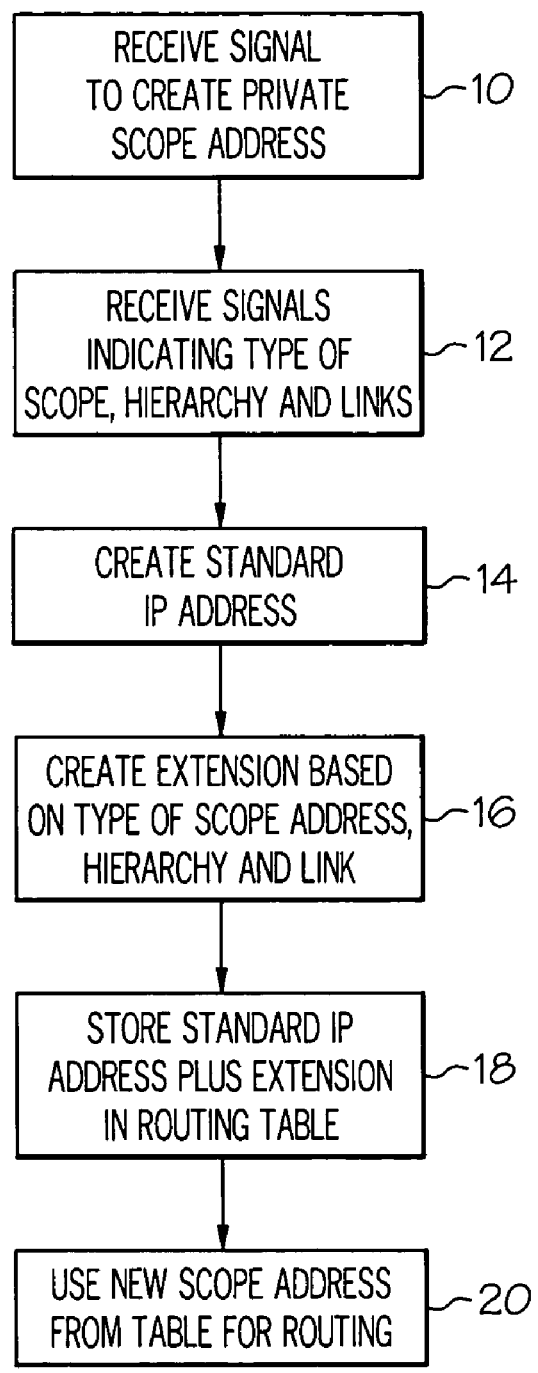
FIG. 1 is a flow diagram illustrating one example of a method for generating scope specific addresses according to principles of the present invention.

FIG. 1 is a flow diagram illustrating one general example of a method for generating scope specific addresses according to principles of the present invention. In this example, at block 10 a request is received to create a scope address for a region within which an application is valid within a network. This can be provided via user inputs from software which can provide a data signal or file indicating the request. Along with the request can be provided additional information needed to create the scope address such as the type of scope to be created, the hierarchical position of the scope and the link or links to which the scope applies, as shown at block 12. For example, the user could create the following configuration file to set up three site local scopes:

[INTERFACE NAME 3C9OXC__1]
   SiteName PRODUCTION
   ADDR FEC0:A::1
   PREFIXLEN 64
[INTERFACE NAME NE2000__1]
   SiteName PRODUCTION
   ADDR FEC0:B::1
   PREFIXLEN 64
[INTERFACE NAME IBMFE__1]
   SiteName RESEARCH
   ADDR FEC0:B::1
   PREFIXLEN 64
   ADDR 3FFE::1
   PREFIXLEN 64

In such a configuration, each link scope need not be identified, as each interface name in the configuration file will correspond to a link scope. Also, hierarchies of the scopes can also be created. For example, site scopes can be created for the hierarchical pair ORGANIZATION and HUMANRESOURCES.

Alternatively, some or all of the configuration data can be created automatically by software. For example, automatic neighbor advertisement setup mechanisms could be utilized, where the host requests to join a multicast group and waits for a router multicast packet which contains information which is equivalent to a section of the configuration file shown above. In this way, the whole boundaries in an organization can be enforced by the router.

Based upon this configuration data, addresses can be created according to principles of the present invention, manually or automatically. In particular, in this embodiment, a standard IP address can be created, such as by using the current IP protocol, as shown by block 14. However, in addition to this standard address, and in accordance with principles of the present invention, an extension can be created, such as is shown at block 16, in order to provide an unambiguous address for the scope address being created. The standard address that is created as well as the extension address can then be stored in a routing table for use in transmitting data to proper locations within the scope, as shown at block 20. For example, if a secure application, such as one including confidential financial details, were to be accessed only by certain computers within a private network formed by certain computers within a company, the new address can be utilized to ensure that no computer outside of those selected computers can connect to that secure application. As can be understood, at least some of the operations shown in FIG. 1 can be automated, such as be conducting the operations on one or more computing devices by software algorithms being executed by the device. In some instances, some of the operations may be carried out simultaneously or combined.

Figures 2, 4A, 4B:
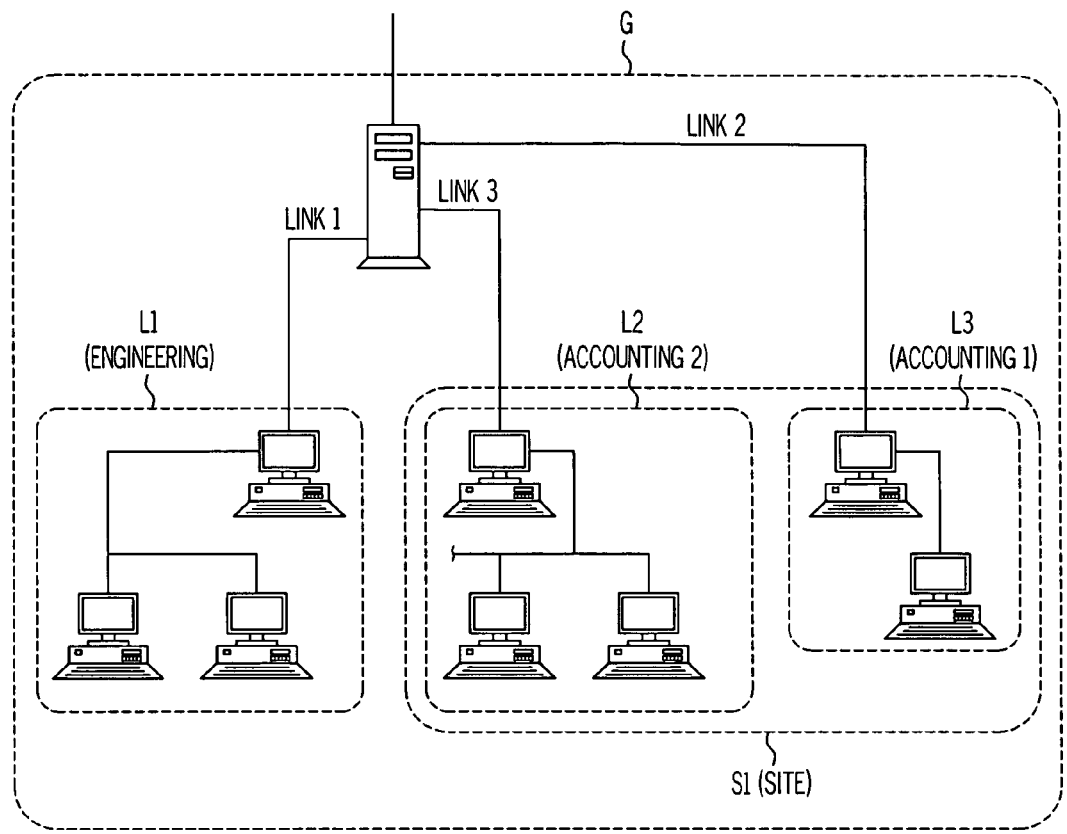
FIG. 2 is a network diagram illustrating an example of various networks, subnetworks, and scopes, to which principles of the present invention can be applied.
FIGS. 4a and 4b illustrate additional examples of networks including routers with which embodiments of the present invention may be utilized.

FIG. 2 is a network diagram illustrating an example of various networks, subnetworks and scopes, to which principles of the present invention can be applied. In this example, a link local scope address is defined according to the Ethernet links in the network. Each link local address defines a private region of validity according to the devices connected to a given link. In this example, for the three links shown, there would be three link local scopes which are defined by regions L1, L2, and L3 and which are connected to router R.

It may also be desirable to define additional regions of validity which are not dependent upon the links. For example, it may be desirable to permit access to a secure application containing confidential financial data from various networks, link local scopes, and/or subnetworks, and the computing devices contained therein. Accordingly, site local scopes can be created to allow access to this secure application only by the authorized locations. In this example, a site local address is formed which is defined by region S1. This site local scope S1 includes link local scopes L2 and L3, each of which are link local scopes assigned to an accounting department within a company. Accordingly, a site local scope can be defined as desired by a user in order to define a private network, and can encompass multiple networks, subnetworks, company departments, company locations, and/or links.

A global scope also exists in this example and encompasses all subnetworks, link local scopes and site local scopes. This global scope is indicated by region G and defines an overall region for the system shown. For example, such a scope can be used for defining a network connectable with the Internet. In this example, the global scope G includes link local scopes L1, L2 and L3, as well as site local scope S1. Thus, the various scopes are arranged in a hierarchical fashion.

As will be described in greater detail below, each of the scopes, G, S1, L1, L2, and L3 can be assigned an extended address by the router R according to principles of the present invention, such that the router R can properly route packets for scopes within a hierarchy. Such an address can include a standard Internet protocol portion as well as an extension, such as a prefix or suffix for example, which provides a unique identifier of the various scopes and indicates the type of scope as well as the instance of the scopes and their hierarchical relative position. In another embodiment, a standard IP address is modified to indicate this information, such as by using reserved bits within the standard address.

Figure 3:
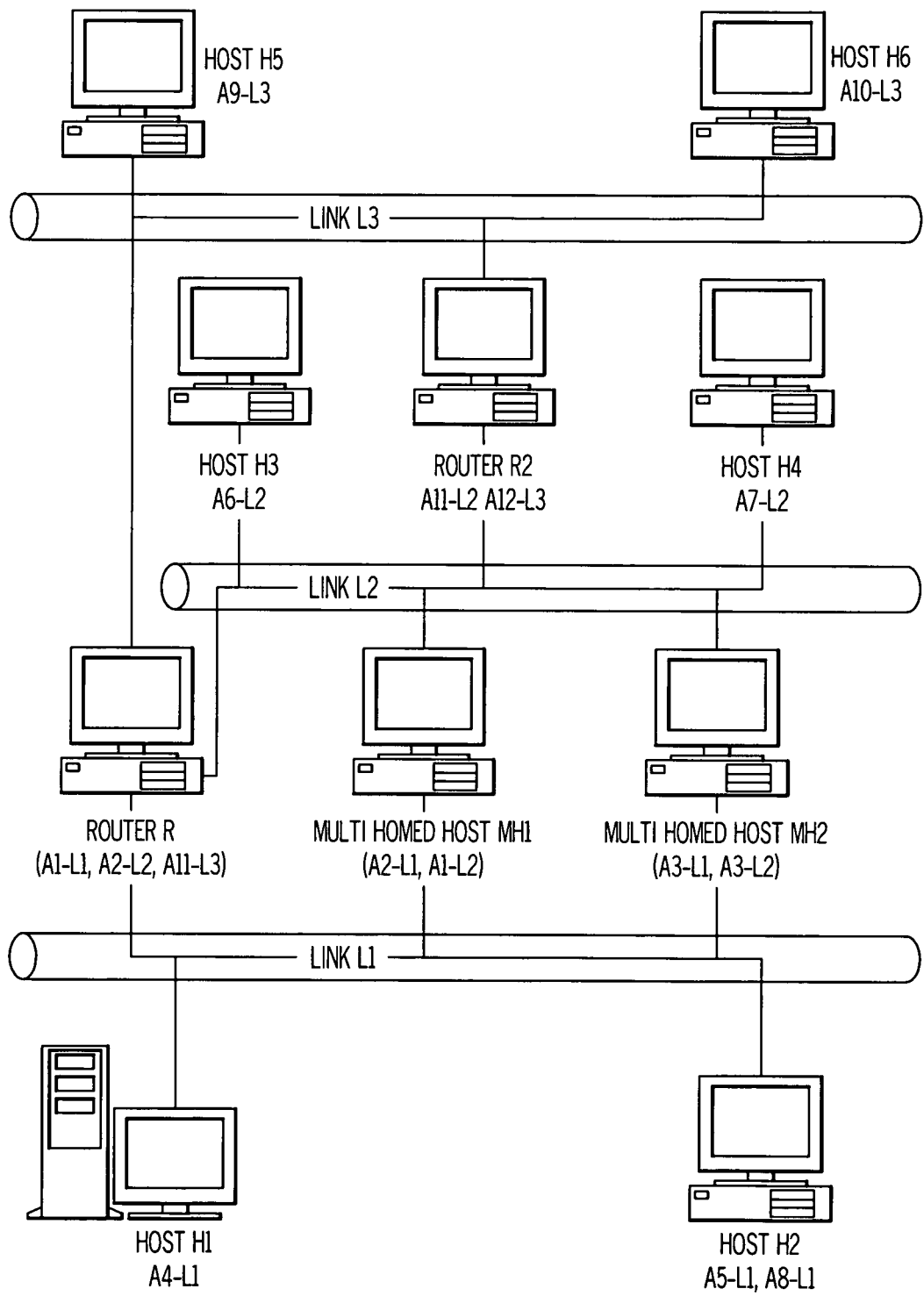
FIG. 3 illustrates a more detailed example of a network to which embodiments of the present invention may be applied.

FIG. 3 illustrates a more detailed example of a network to which embodiments of the present invention may be applied. The example network in FIG. 3 shows a router R connected to three link local regions. This example also includes scopes with addresses. As mentioned above, the scope addresses have a topology in which they are valid. Global scoped addresses are valid across several networks and their lesser site and link scope addresses have their respective regions of validity. An extreme case of potential address ambiguities is presented by the multi-homed host MH2, where the same address (A3) is assigned to two links which are logically different as they are on different link scoped regions (link 1 region and link 2 region). Accordingly, the addresses need to be unique in order to avoid such a problem.

An example of TCP routing protocol utilized with respect to the MH2 host further illustrates the problem. When using transmission control protocol (TCP), a TCP connection is typically represented by the following values: Source address, Destination address, Source port, Destination port. Accordingly, using such a scheme, a TCP connection established in link local region L1 between MH2 and R would be represented by the values {A3 A2 SP DP} and a connection established on region L2 between MH2 and MH1 would also be represented by the same values {A3 A2 SP DP}. Accordingly, the two TCP sets are redundant and do not identify whether the packet is to be sent from MH2 to R or from MH2 to MH1.

To differentiate between these two connections, and as described in further detail herein, a zone index could be defined to identify the instance of scopes for both source and destination addresses. In addition, there could be an additional address which is valid in both links. For example, A4 and A7 global addresses are assigned to hosts H1 and H4 which are assigned R as the default router. If a computer at link scoped address A8 attempts to connect to a global address A7, the router R should enforce the boundary by not allowing packets with source address A8 from link L1 to cross over to L2. Present network addressing implementations do not have a proper integrating mechanism to deal with zone indexes for different scope regions and also different subnets as defined by administrators.

However, according to principles of the present invention and as described in further detail herein, each address in the network of FIG. 3 can be modified so that it is expanded with an extension or modified with an identifier, for future additions and for distinguishing scopes. In some embodiments, this can be carried out by prefixing the address with a field of n-bit width. The new prefix bits then represent the scope hierarchy and the new expanded address represents a combination of both scope and standard subnet addressing hierarchies. A single routing table implementation can then be used to house the new addresses. Thus, in this embodiment, the longest matching prefix rules of standard IP addressing can be extended to different scope hierarchies. Address assignment flexibility can be provided with these n-bits such that an efficient scheme, which corresponds to subnet addressing, can be employed to address nested scoped regions. A single longest prefix match but with a longer prefix length can then be used for the lookup.

More specifically, in some embodiments, each standard address can be assigned a prefix that has link local, site local and global hierarchies defined as part of the prefix. The prefix can also identify the subnet of the address as well as the scope. This instance information is also referred to herein as the zone information.

In such an illustrative address architecture, the extended address therefore has the following general structure
—Zone Type 0—Zone Type 1—Zone Type 2—IP Subnet Prefix—IP Host ID The three parts of the Zone (scope) address prefix (Type 0, 1 and 2) represent multiple internal subnets which are used to qualify the standard IP address which makes up the remainder of the address (i.e., the IP Subnet Prefix and IP Host ID). The following table provides an example of how such a prefix could be assigned. In particular, the prefix can include three positions which indicate whether the address is global, site local, or link local, the values in the prefixes being dependent in part on the instance or number of the scope. In particular, for a link local scope, the value in the link scope column indicates the link number, the value in the site scope column indicates the site number that the link belongs to, and the value in the interface column indicates the interface number where that site and link are located.

TABLE 1

Mapping of Interface Index Number and Scope Type to Internal Address

| Interface Number | Scope | Global | Site Local | Link Local |
|---|---|---|---|---|
| 1 | Link | 0 | 1 | 1 |
| 1 | Site | 0 | 1 | 0 |
| 1 | Global | 0 | 0 | 0 |
| 2 | Link | 0 | 2 | 2 |
| 2 | Site | 0 | 2 | 0 |
| 2 | Global | 0 | 0 | 0 |
| 3 | Link | 0 | 2 | 3 |
| 3 | Site | 0 | 2 | 0 |
| 3 | Global | 0 | 0 | 0 |

Thus, in this example, for every interface there are 3 possible scoped address types, namely link, site and global. The scope column represents the type of address assigned to each interface. The Global, Site Local, and Link Local columns represent the instance values (i.e., scope number) for the particular scope.

The above table gives an example of assignments at the router R of FIG. 3. The configuration in this example is as follows. First, there are three links and therefore three link scoped regions L1 L2 L3 (each link defining a linked scoped region). Next, there are 2 sites which have been user defined, L1 belonging to one site and L2+L3 belonging to another site. Finally, there is a single global region The 1st row of the table is read as the internal addressing structure for an address on interface 1 and which has a link scope prefix of <0 1 1>. It can thereby be inferred that link 1 belongs to site scope number 1, because the value "1" is in the third location (e.g., the third column), indicating link 1, and the value "1" is in the second location indicating site scope 1. From the site local column and link local column of the other entries in the table, it can then be inferred that link 2 and link 3 belong to site 2 and also link 1 belongs to site 1.

Accordingly, in accordance with principles of the present invention, in order to define a scope address, the instance (or number) of the link scope, site scope and global scope can be positioned in predefined link, site and global positions in order to form an internal extended prefix, such as by using, for example, the format of table 1. The standard prefix length can then be added with the internal subnet prefix length to form the new routing table entry. In addition, scope id defaults can be added as well. For example, in an internal address with internal prefix of length 32 and with 1 bit for global, 15 bits for site local, and 16 bits for link local, an internal address/1 could represent a default for all site local areas and internal address/16 would represent default for a particular zone area. This structure is complementary with standard IP addressing schemes which include static addresses for different subnetworks.

Thus, hierarchical identification of the various scopes can also be provided by the prefix length. For example, a default value can be provided to denote the fact that the prefix would match any key, and therefore that all lower hierarchies are contained within it. However, if the prefix is provided with a particular non-default value, then that entry can be treated as a default for a hierarchy of entries having longer prefixes built from that value. Therefore, the prefix length can extend from, for instance, 0 to 32 additional bits, with the standard address then utilizing its standard number of bits (e.g., 128 bits for IPv6) and typically being provided by the user from the configuration file. An entry in the routing table like 0-1-1 32 would then represent all addresses belong to the link which are link local and can be used to specify an action for enforcing link scope boundary.

Example addresses according to this improved architecture will now be provided. Consider the configuration of FIG. 4a, with A and B being hosts and R being a router. The standard addressing could be assigned as follows A is assigned FE80::1/64
B is assigned FE80::2/64
R is assigned FE80::3/64 in A's link
R is assigned FE80::4/64 in B's link (In such notation, the portion prior to the "::" is a 128 bit address, the symbol "::" represents contiguous 0's while "/64" represents the number of prefix bits in the standard IP address which are used to identify a particular sub-network.)

All the addresses in this example are link local addresses. However, in this example, there are two instances of link scopes (i.e., the two hosts A&B). According to principles of the present invention, numbers 1 and 2 could be assigned to distinguish the link scope instances, and a 32 bit prefix could be assigned to the two router addresses, such that the addresses at the router would then be as follows:

0-0-1-FE80::3/96
0-0-2-FE80::4/96

(Note that the notation "/96" is used to incorporate the additional extension hierarchy on the left (the prefix) which is 32 bits in length in this example. (i.e., the notation "0-1-1" is actually 32 bits in length)).

This example assumes that the configuration is part of a single global and site space. However, consider the configuration of FIG. 4b, with router R connected to two other routers R1 and R2 having a separate site each. The various scopes need to be distinguished, but at a higher span so as to incorporate topologies behind routers R1 and R2. In this example, additional addresses at the router R could be assigned as follows 0-1-1-FE80::3/96
0-2-2-FE80::4/96

Thus, use of the "1" and the "2" in the site local locations of the prefix for these new link local addresses indicate that the addresses are part of the site local scope "1" (which includes router R1 and host A) and the site local scope "2" (which indicates router R2 and host B) respectively. Note that prefix assignments can also be done implicitly if the interfaces are grouped. For example, in Table 1 above, interface 2 and 3 were grouped as belonging to a single site local scope, and the generation of instance values for each row can then be done automatically after the grouping.

In use of such extended addresses created according to principles of the present invention, an address lookup function can be utilized when an application decides to send out a packet or when a packet arrives from one interface and a decision is to be made on that packet. In general, the address lookup function can be dependent on the internal address structure as follows.

PTrieSearchKey (key, internal prefix length+subnetprefix-length)

In this example, the lookup function is a standard Patricia trie lookup function and the key is the internal address. For such lookup functions, the internal address can be formed in a manner depending on two possible contexts, namely whether the packet arrives into the host from another system (local receive or forwarding) or originates from this system (packet send from an upper layer). In the first instance, the packets arriving into the system from an interface can use the interface and scope as the key to determine the internal network prefix information. After this determination, routing table lookup can be conducted and standard operations as defined by the protocol can also be conducted. After receiving the packet, and mapping the internal address, the routing table lookup function can directly decide whether to forward the packet across the internal networks. This in turn results in forwarding to the correct scopes in the external networks.

In the situation of a packet transmission from an application in an upper layer, a scope aware application can qualify the connection using the specific scope indexes. Other applications, which are not dependent on the scope and will transmit to any scope, can use a default value which would be used for internal address formation. Thus, applications can be classified as scope aware applications and scope unaware applications, and a default can be assigned as scope unaware. The routing protocols which control the packet forwarding decisions can also be classified as scope aware and unaware forms, with scope unaware applications and protocols avoiding the scope routing decisions described above.

However, while Patricia tries have been described above, other longest matching prefix algorithms or fast lookup algorithms could be utilized as alternatives. For example, link list, radix tree, and hash table algorithms, and their associated data structures, could be utilized. In such longest matching prefix algorithms, the routing table can consist of several keys of various prefix lengths as well as some information describing those keys. For example, an address binding such as FE80::1 to a link could automatically generate the internal prefix and create entries such as the following:

| NO | KEY | PREFIXLEN | Interface to Send out Out |
|----|-----|-----------|---------------------------|
| 1 | 0-1-1-FE80::1 | 128 + 32 | Upper Layer I/F 256 |
| 2 | 0-1-1-FE80:: | 64 + 32 | Out through I/F 1 |
| 3 | 0-1-1-:: | 32 | Out through I/F 1 |

Then, for any given key, the longest matching rule would match the key whose prefix best matches the incoming key. For instance, suppose a key of the form 0-1-1-FE80::9 is extracted from a received packet. The lookup would try to match the best available prefix in this case which is entry 2 which indicates that it should be sent out through interface 1. The interpretation and validity of the action suggested by the routing table entry is then dependent on the operation mode of the host. In this current case, the scope of the address is link and the lookup would not give information for the packet to go out of the boundaries. If, as another example, the extracted packet is 0-1-1-FE80::1, it would be matched by entry #1 which indicates that the packet should be handed to the upper layer Thus, the use of longest matching algorithms allows the table to always find the best matching region to which the packet is to be transmitted. Because the scope prefixes can be included as a hierarchy in the routing table of a router according to principles of the present invention, the packets can easily be kept and routed inside their scopes.

In order to map connections to the new internal address structure, a variety of methods may be utilized. Protocols at upper network layers typically deal with scoped addresses by qualifying each connection with a zone index. This helps to identify ambiguous connections. For example, a TCP connection is typically qualified as follows <Source Zone Index, Source Address, Source Port, Destination Address, Destination Port, and Destination Zone Index >

According to additional principles of the present invention, a table can be utilized within a router which correlates the zone index and the scope type to the correct prefix, for correct routing of the packet. In particular, a departing packet can be looked up in such a table using Destination Zone Index and Scope as the key for finding the extended address prefix for the packet. Then, after the correct extended address prefix is determined for the destination of the packet, the routing table lookup function described above can be conducted for finding the exact decision on the packet.

For example, a table such as the following could be utilized to conduct such an initial lookup of extended address prefixes.

TABLE 2

Mapping Zone Index and Scope Type to Internal Address Prefix

| Number | Zone Index | Scope | Global | Site Local | Link Local |
|---|---|---|---|---|---|
| 1 | 1 | Link | 0 | 1 | 1 |
| 2 | 2 | Link | 0 | 2 | 2 |
| 3 | 3 | Link | 0 | 2 | 3 |
| 4 | 1 | Site | 0 | 1 | 0 |
| 5 | 2 | Site | 0 | 2 | 0 |
| 6 | 0 | Global | 0 | 0 | 0 |

Accordingly, use of such an initial table can allow for proper packet transmission by mapping standard indexes to the proper prefix.

Figure 5:
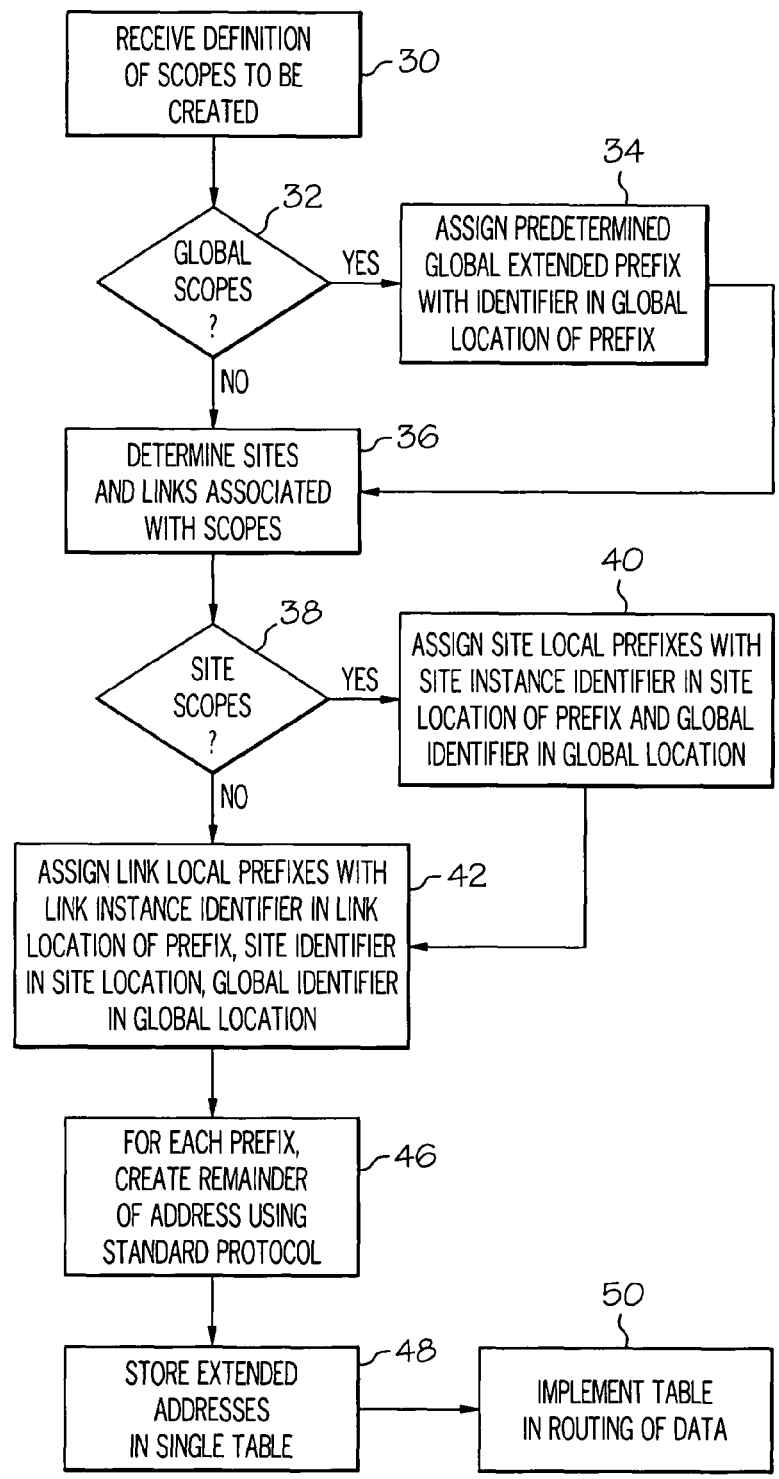
FIG. 5 is a flow diagram depicting another example of a method of assigning network addresses according to principles of the present invention.

FIG. 5 is a flow diagram depicting another example of a method of assigning network addresses according to principles of the present invention. According to this example, a definition of the scopes to be created is received, as shown at block 30. This definition data can include the types of scopes to be created, the network devices and links that these encompass. Alternatively, the definition can be in the form of a network mapping data or network configuration data, and the required information can be derived or extracted therefrom.

It can then be determined if a global scope is to be defined, as shown at block 32. If such a scope is to be defined, then the scope address for this global scope can be created using a predetermined prefix for use with global scopes, as shown at block 34. This prefix includes data which identifies the number or instance of the global scope, and this data is placed in predetermined location assigned for global data within the prefix. For example, the prefix 0-0-0 could be assigned to indicate the first instance of a global scope.

Then, the process can continue to block 36, where the site and link data associated with the remaining scopes to be created can be determined or obtained. At block 38, if site scopes are to be created, the process conducts the operation shown in block 40. In particular, for each site local scope address to be created, a site local prefix is assigned. This prefix includes data which identifies the number or instance of the site scope, and this data is placed in the proper location for site data within the prefix. In the examples shown above, this data is located in the second location of the prefix, although other locations and data arrangements could be utilized. In addition, the global scope to which the site belongs is also indicated by an identifier in the prefix. In the examples shown above, this global scope identifier is provided in the first location of the prefix. For example, the prefix 0-2-0 is a site local prefix for the second instance of a site local scope belonging to the global scope "0".

After dealing with global scope prefixes and site scope prefixes, the remaining scope prefixes to be created according to this illustrative method would be link local prefixes. Thus, as shown at block 42, the link local prefixes are assigned for the link local scopes. In this example, an identifier of the instance or number of the link is placed in a location within the prefix which corresponds to the location for link instance identifiers. Likewise, if the link local scope is within a site local scope, the site identifier would be placed in the site location for the link local prefix, as also shown at block 42. Moreover, the global scope to which the link local scope belongs can be identified by placing an identifier in the global location of the prefix. For example, a link local prefix of 0-2-2 could be formed to indicate that the second link is within the second site local scope which is within the global scope "0." Accordingly, the hierarchy of the various scopes can be indicated by the prefixes.

Thus, following completion of the operations of block 42, all of the prefixes for the various scopes have been generated. As shown at block 46, the method then creates the remainder of the address for the various scope addresses using a standard protocol, such as IPv6 protocol or other network addressing protocol. This remainder could then include a subnet identifier as well as a host identifier, and any other information utilized in the standard address. (Block 46 could also be conducted prior to or simultaneously with the prefix generation rather than following the prefix generation). The scope addresses, which therefore comprises a prefix in conjunction with a standard address format, can then be stored in a single table, as shown at block 48. The table can then be implemented in the routing of data packets, such as in a manner discussed above, as shown at block 50.

The above illustrative embodiments of the invention can be utilized in a variety of applications. For example, if two organizations or departments with the same private address ranges merge, then the use of the extensions described above can be utilized to distinguish the private addresses and provide unambiguous identification of different private regions using a single routing device. Another potential application is in a VOIP (voice over Internet Protocol) module which acts as a private branch exchange for two logical private branches. If internal telephone numbers are mapped into IPv6 addresses, then the two logical private branches need to be supported with the potential to include the same numbers. Furthermore, an IPv6 network which is deployed on the fly, such as a temporary wireless network created in a situation like a medical emergency or at trade show conference, needs to set up multiple domains from a single provider which needs to be separate with its own addressing scheme. The provider needs to provide services easily on a per logical region basis. Note that current assignment schemes are typically automatic and cross domain verification of addresses are not supported by existing protocols.

Another area within which the principles of the present invention may be utilized involves connectivity of source routing with the ability to provide enough information to navigate a private region. In summary, any boundary enforcing routers can face the domain addressing problems described earlier, and principles of the present invention can be applied to such routers and similar equipment and situations.

As can be understood, some or all of the addressing and routing functions described herein can be implemented in computer executable instructions which can include one or more functional modules. Each module can comprise one or more sets of executable instructions, routines, functions, sections of code, software components, programs, or the like, which operate via one or more processors, controllers, computational devices, or appropriate hardware components. A variety of programming languages can be utilized for this purpose. Moreover, the data and programmed methods referred to herein may be stored on any suitable storage medium, such as on hard disk drives, CD-ROM drives, backup storage devices, or other memory devices, such as suitable non-volatile optical, magnetic, or electronic memory devices. Furthermore, while the computing devices are referred to herein, it should be understood that these devices could comprise any of a variety of suitable types of computers, data processors, or other circuitry or hardware connected in a appropriate manner for use for the described functions.

The foregoing description of the illustrative embodiments has been presented for purposes of illustration and description of the various principles of the inventions. It is not intended to be exhaustive or to limit the inventions to the precise forms disclosed, and modifications and variations are possible in light of the above teachings. For example, although a number of methods, systems, operations, and configurations have been described in the illustrative embodiments, it is to be understood that additional or alternative methods, systems, orders of operation and configurations could be used without departing from the scope of the inventions. As another example, rather than using an address extension, an address modifier could be utilized, such as by using reserved bit fields or other bits in a standard address, to identify scopes using the scope information described above. Moreover, although various aspects of the inventions have been illustrated, these aspects need not be utilized in combination.

Therefore, it should be understood that the embodiments were chosen and described in order to best illustrate the principles of the inventions and some examples of possible practical applications. This illustration was also provided to thereby enable one of ordinary skill in the art to utilize the inventions in various embodiments and with various modifications as are suited for the particular use contemplated. Accordingly, it is intended that the scope of the inventions be defined by the claims appended hereto.

What is claimed is:

1. A method for creating private network addresses for scopes of validity within a private network, the method utilizing executable instructions and comprising:
   receiving a data signal indicating a request to create a scope address for at least one of the private network addresses;
   determining whether to communicate data to a group of entities within the network which will correspond with the scope address, wherein the signal includes a type of scope to be created, a hierarchy of the scope, and a link to which the scope is associated;
   generating a standard network address in response to the receiving the data signal, the standard network address having an Internet Protocol address format with X number of bits per a corresponding version;
   generating an address extension in response to the receiving the data signal, the extension identifying the type of scope, the hierarchy of the scope, and the link;
   forming a combined address from the standard network address and the address extension, the combined address having a number of bits equal to or greater than X+1; and
   storing the combined address in a single routing data structure utilized for routing information by a single router device.

2. The method as recited in claim 1, wherein the address extension comprises a prefix.

3. The method as recited in claim 1, wherein the generating steps and the forming step occurs substantially simultaneously.

4. The method as recited in claim 1, wherein the routing data structure comprises a data structure utilized with a longest matching prefix algorithm.

5. The method as recited in claim 1, wherein the generating the address extension further includes determining a length of the extension in bits according to the hierarchy.

6. The method as recited in claim 1, wherein the generating the address extension further includes generating an address prefix, a length of the prefix being defined by the hierarchy, such that a broad scope encompassing several entities has a shorter prefix and a narrow scope encompassing some of the entities within the broad scope has a long prefix.

7. The method as recited in claim 6, wherein the long prefix includes the short prefix.

8. A system for automatically creating a scope address for use with entities within a larger private network, the system comprising:
   an address request interface configured to receive a request for the generation of an address for a region of validity within the network that includes subnetworks;
   an address generation module configured to create 1) a standard network address having an Internet Protocol address format with X number of bits per a corresponding version and 2) an extended address for the region of validity based upon the request received from the address request interface, wherein the extended address corresponds to the accepted protocol within the network and wherein the extended address mimics the protocol utilized for subnetworks within the network, the standard network address and the extended address together forming a combined address having at least X+1 number of bits; and
   an address storage module configured to store the combined address within a data structure utilized for routing data within the network.

9. The system as recited in claim 8, wherein the modules comprise executable instructions.

10. The system as recited in claim 8, wherein the data structure comprises a data structure utilized with a longest matching prefix algorithm.

11. The system as recited in claim 8, wherein the regions comprise scopes arranged within a hierarchy, each scope and its hierarchical position being identified by prefix bits within the extended address.

12. A non-transitory computer readable medium having encoded thereon a data structure for identifying a private network address of a scope of validity within a private network, the data structure comprising:
   a standard address portion for the private network address, the standard address portion corresponding to an Internet Protocol address format with X number of bits per a corresponding version; and
   an address extension portion for the private network address, the address extension portion in conjunction with the standard address portion forming a combined network address for a network device having at least X+1 number of bits, the address extension portion including scope identification data for identifying a type of scope corresponding to the combined network address and identifying whether the device represented by the combined network address may communicate with an application, wherein the standard address portion and address extension portion are stored so as to be used in conjunction.

13. The computer readable medium as recited in claim 12, wherein the address extension portion comprises a prefix.

14. The computer readable medium as recited in claim 12, wherein the address extension portion and standard address portion are stored in a longest matching prefix data structure.

15. A method for generating a private network address for a scope within a network, the method comprising:
- determining a type of scope to be created for the private network address;
- based upon the type of scope to be created, generating an address prefix containing prefix data, wherein the type of scope determines at least one of the values of the prefix data placed in the address prefix and a location of that prefix data within the address prefix;
- generating a standard Internet protocol address for the scope to be created, wherein the standard Internet protocol address includes a subnet prefix and a host ID and has X number of bits per a corresponding version; and
- saving the address prefix in a routing table along with the standard Internet protocol address, such that the address prefix is associated with the standard Internet protocol address and together has at least X+1 number of bits, the routing table being configured to be utilized in the selective communication of data within the scope.

16. The method as recited in claim 15, wherein the generating the standard Internet protocol address further includes generating the standard number of bits at 128 bits for the corresponding version of IPv6.

17. The method as recited in claim 15, wherein the type of scope comprises at least one of the following: global scope, site local scope, and link local scope.

18. The method as recited in claim 15, wherein the prefix data comprises at least one of the following: link number and site number.

19. The method as recited in claim 15, wherein the address prefix includes positions for a site identifier and a link identifier.

20. The method as recited in claim 15, wherein the routing table comprises table utilized in a longest matching prefix algorithm.

21. A private network of computer devices, the private network comprising:
- a plurality of hierarchal scopes, each scope indicating various devices that are allowed certain access rights to data in the private network by a routing device; and
- a single routing table created by a routing device from configuration data for use by the device in allowing access to data, the table including a modified address for each scope, the modified address including a scope portion for identification of the scope and a standard portion conforming to a standard network protocol, the standard portion having an Internet Protocol address format with X number of bits per a corresponding version and the modified address having a number of bits equal to or greater than X+1.

22. The network as recited in claim 21, wherein the scopes are hierarchical in nature and include at least one of a global scope, a site local scope, and a link local scope.

23. The network as recited in claim 21, wherein the scope portion comprises a prefix.

24. The network as recited in claim 21, wherein the routing table comprises table utilized in a longest matching prefix algorithm.

* * * * *